(12) United States Patent
Chen

(10) Patent No.: US 9,049,208 B2
(45) Date of Patent: Jun. 2, 2015

(54) SET TOP BOX ARCHITECTURE SUPPORTING MIXED SECURE AND UNSECURE MEDIA PATHWAYS

(71) Applicant: Broadcom Corporation, Irvine, CA (US)

(72) Inventor: Xuemin (Sherman) Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/716,683

(22) Filed: Dec. 17, 2012

(65) Prior Publication Data

US 2014/0115330 A1    Apr. 24, 2014

Related U.S. Application Data

(60) Provisional application No. 61/715,785, filed on Oct. 18, 2012, provisional application No. 61/725,964, filed on Nov. 13, 2012, provisional application No. 61/733,958, filed on Dec. 6, 2012, provisional application No. 61/734,700, filed on Dec. 7, 2012.

(51) Int. Cl.
*H04L 29/06* (2006.01)
*H04N 21/443* (2011.01)
(Continued)

(52) U.S. Cl.
CPC ............. *H04L 63/105* (2013.01); *H04L 63/18* (2013.01); *H04N 21/443* (2013.01); *H04N 21/4627* (2013.01); *H04N 21/8166* (2013.01)

(58) Field of Classification Search
CPC ... H04L 63/18; H04L 63/105; H04N 21/4627
USPC ............................................ 713/166; 726/14
See application file for complete search history.

(56) References Cited

U.S. PATENT DOCUMENTS 6,665,872 B1 * 12/2003 Krishnamurthy et al. ...... 725/95
6,868,403 B1 *  3/2005 Wiser et al. .................... 705/51
(Continued)

FOREIGN PATENT DOCUMENTS

EP    2323338 A1    5/2011
GB    2411554 A *  8/2005

OTHER PUBLICATIONS

European Patent Office; European Search Report; EP Application No. 13004997.6; Jan. 9, 2015; 3 pgs.

*Primary Examiner* — Hadi Armouche
*Assistant Examiner* — Sher Khan
(74) *Attorney, Agent, or Firm* — Garlick & Markison; Bruce E. Garlick

(57) ABSTRACT

A media processing device, such as a set top box, having a plurality of selectable hardware and software components for supporting multiple media pathways providing differing levels of security. In general, each security level corresponds to a particular certification service boundary definition(s) or key/authentication and security management scheme for managing resources such as hardware acceleration blocks and software interfaces. Different sets of components may be adaptively employed to ensure composited compliance with one or more security constraints and to address component unavailability. Security constraints may be applied, for example, on a source or media specific basis, and different versions of a media item may be provided over multiple pathways providing corresponding levels of security. In one embodiment, a service operator or content provider may provide requisite certification or security requirements, or otherwise assist in selection of pathway components.

20 Claims, 12 Drawing Sheets

• secure (certified) and unsecure adaptable media pathways supported through multiple hardware accelerated and software pathway elements

(51) Int. Cl.
  *H04N 21/4627* (2011.01)
  *H04N 21/81* (2011.01)

(56) References Cited

U.S. PATENT DOCUMENTS 8,424,099 B2 * 4/2013 Fahrny ............................ 726/26
2005/0060411 A1 * 3/2005 Coulombe et al. ............ 709/227
2005/0064846 A1 3/2005 Karaoguz et al.
2006/0023883 A1 2/2006 Konetski et al.
2007/0204078 A1 * 8/2007 Boccon-Gibod et al. ....... 710/54
2008/0107017 A1 * 5/2008 Yuan et al. .................... 370/228
2008/0209212 A1 8/2008 Ditzman et al.
2010/0306860 A1 * 12/2010 Risan .............................. 726/33

* cited by examiner

SET TOP BOX ARCHITECTURE SUPPORTING MIXED SECURE AND UNSECURE MEDIA PATHWAYS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/715,785, entitled "INTEGRATION OF UNTRUSTED FRAMEWORK COMPONENTS WITH A SECURE OPERATING SYSTEM ENVIRONMENT," filed Oct. 18, 2012.

2. U.S. Provisional Patent Application Ser. No. 61/725,964, entitled "INTEGRATION OF UNTRUSTED APPLICATIONS AND FRAMEWORKS WITH A SECURE OPERATING SYSTEM ENVIRONMENT," filed Nov. 13, 2012.

3. U.S. Provisional Patent Application Ser. No. 61/733,958, entitled "SECURITY AND CERTIFICATION IN A SET TOP BOX DEVICE HAVING A MIXED OPERATING SYSTEM OR FRAMEWORK ENVIRONMENT," filed Dec. 6, 2012.

4. U.S. Provisional Patent Application Ser. No. 61/734,700, entitled "SET TOP BOX ARCHITECTURE SUPPORTING MIXED SECURE AND UNSECURE MEDIA PATHWAYS," filed Dec. 7, 2012.

BACKGROUND OF THE INVENTION

1. Technical Field of the Invention

The present invention relates generally to media processing systems and, more particularly, to establishing and maintaining secure and unsecure media pathways in a device such as a set top box having untrusted components integrated with a secure operating system environment.

2. Description of Related Art

Attempts to accommodate relatively untrusted software applications or frameworks in certain types of devices may complicate applicable certification processes that are performed in accordance with one or more industry defined certification standards or testing procedures. For example, vendor certification of many set top boxes used by cable operators is conducted via rigid certification processes that test interoperability and security compliance for devices that implement specifications such as DOCSIS®, PacketCable™, CableHome™, and OpenCable™. Successful certification of such devices typically requires full end-to-end security. Likewise, digital rights management (DRM) and other technologies implemented in a particular device or component (such as a system-on-a-chip) may require distinct certification processes which do not allow certain interactions with an unsecured operating system (OS) environment or software framework. When implemented in a cable set top box, cable modem, media terminal adapter or like cable service device, certain specifications may require that a digital certificate be embedded in the device at the time of manufacture. Such certificates underpin a number of security features including device authentication and content integrity. By way of example, a digital certificate embedded in such devices helps prevent pirating of services by allowing a content provider or service operator to authenticate a device requesting services.

In general, any unsecured portions of a media pathway in a set top box or like device, if not isolated, will cause the certification of such pathway to fail. Most conventional set top boxes are designed to provide a single secure and certified pathway through the various elements or components of the device. In some recent multi-processor set top boxes, a conventional certified pathway is separated from untrusted components by creating a hardware boundary between the two. In particular, a first processing module is utilized to provide secure functionality (e.g., decoding operations), while a separate processing module with a lower security level is used to support an untrusted framework.

As is known, a software framework may provide application programming interface functionality and services that are not offered by an underlying operating system, and may thereby offer a level of platform independence in certain implementations. Frameworks are often designed to be a reusable and adaptable software system or subsystem. For example, Android has become one of the fastest-growing operating systems/frameworks for mobile devices. Android, which builds on contributions from the open-source Linux community, provides development tools and reusable components for building applications that can be deployed across many different types of devices, such as a smartphone or tablet device.

A typical Android framework is a "multi-user" Linux-based system in which each Android application is a different "user" having code that runs in general isolation from other applications. Such process isolation (or application "sandbox") provides a certain level of security. However, various components, processes, threads, etc. used by an application may not entail sufficient protection when integrated in a set top box-type device, resulting in Android being considered an "untrusted" framework when used in such devices. For example, an application that visits an arbitrary web page or receives code from an unverified third party may result in untrusted JavaScript code being executed on a set top box, possibly with elevated privileges. Such code might exploit weakness in other code (e.g., browser code) and receive unauthorized access to file systems, etc., thereby compromising the security of a device, exposing protected data or introducing system instability.

As indicated above, the processing unit of some devices may have multiple processors or processing cores in order to provide higher performance and/or multi-tasking capabilities. In some of these multi-processor systems, when multiple applications or programs are running, access control is typically needed to separate the functionality of the applications running on multiple processors. Separation or segregation of different applications and/or tasks running on different processors helps to ensure that one application does not interfere with the execution of another. Likewise data assigned to one processor should not be accessed by another processor, unless that data is shared between the two processors. Such separation is typically handled through use of virtual memory, with each process having a unique view of memory that is not accessible from outside processes. Hardware access can be handled through a kernel or device driver interface, which provides some level of security. Even in a multi-processor system in which one processor environment provides trusted or secure operations while another operates in an unsecure or restricted environment, however, there can be a substantial possibility of an incursion from the unsecure zone into the secure zone when the operating system is managing the separation.

For example, in a set top box that allows a user to receive television signals and also allows the user to access the Internet, the secure environment may run applications (including a secure set top box application) pertaining to the reception, decryption and display of certain channels or content provided by a cable or satellite provider or other service operator. The unsecure environment in the set top box may execute applications, such as Android-based applications, that allow a user to access the Internet for web browsing, gaming, etc. In this example, the content provider would generally not want the user or anyone else to access the applications pertaining to broadcast or premium channels. However, if there is commonality in software that controls the accesses to both environments, such as running the same operating system to manage accesses in both environments, then there may be a heightened risk of access violations. Such violations, whether intentional or non-intentional, could result in an unsecure breach into the secure applications of the set top box, such as a web-originated intrusion into protected television channels.

Accordingly, there is a need to obtain an efficient way to integrate untrusted frameworks and applications with a secure operating system environment such as that of a set top box device, while also maintaining compliance and flexibility with respect to applicable certification procedures and security measures.

DETAILED DESCRIPTION OF THE INVENTION

While certain embodiments are described in conjunction with an Android framework and/or Linux operating system, other embodiments of the present invention may be practiced with a variety of current or future operating systems/kernels and frameworks, and employ a variety of computing circuits, devices, servers and/or systems that might utilize multiple processors, processing cores and/or processing circuits. Further, certain of the illustrations herein describe a processing module, a processor or a CPU (e.g. CPU1, CPU2) for a device that provides a processing function in the described embodiments. However, it is appreciated that a variety of other devices and/or nomenclature may be used in other embodiments to provide for the processing function in practicing the invention. The invention may be readily adapted to other usages where multiple processing environments (zones, domains, etc.) exist, in which separation and/or segregation between two or more zones is desired. Likewise, while certain embodiments are described as implemented by a set top box (STB) or like media processing device performing trusted media processing operations, the novel architectures and methodologies are applicable in whole or in part to other devices, including media consumption devices such as PVR's, DVD players, access points, televisions, computing devices, smartphones, etc. As used herein, conditional access (CA) refers to the protection of content by requiring certain criteria to be met before granting access to this content, while DRM refers to any technology that inhibits uses of digital content that are not desired or intended by the content provider.

Figure 1:
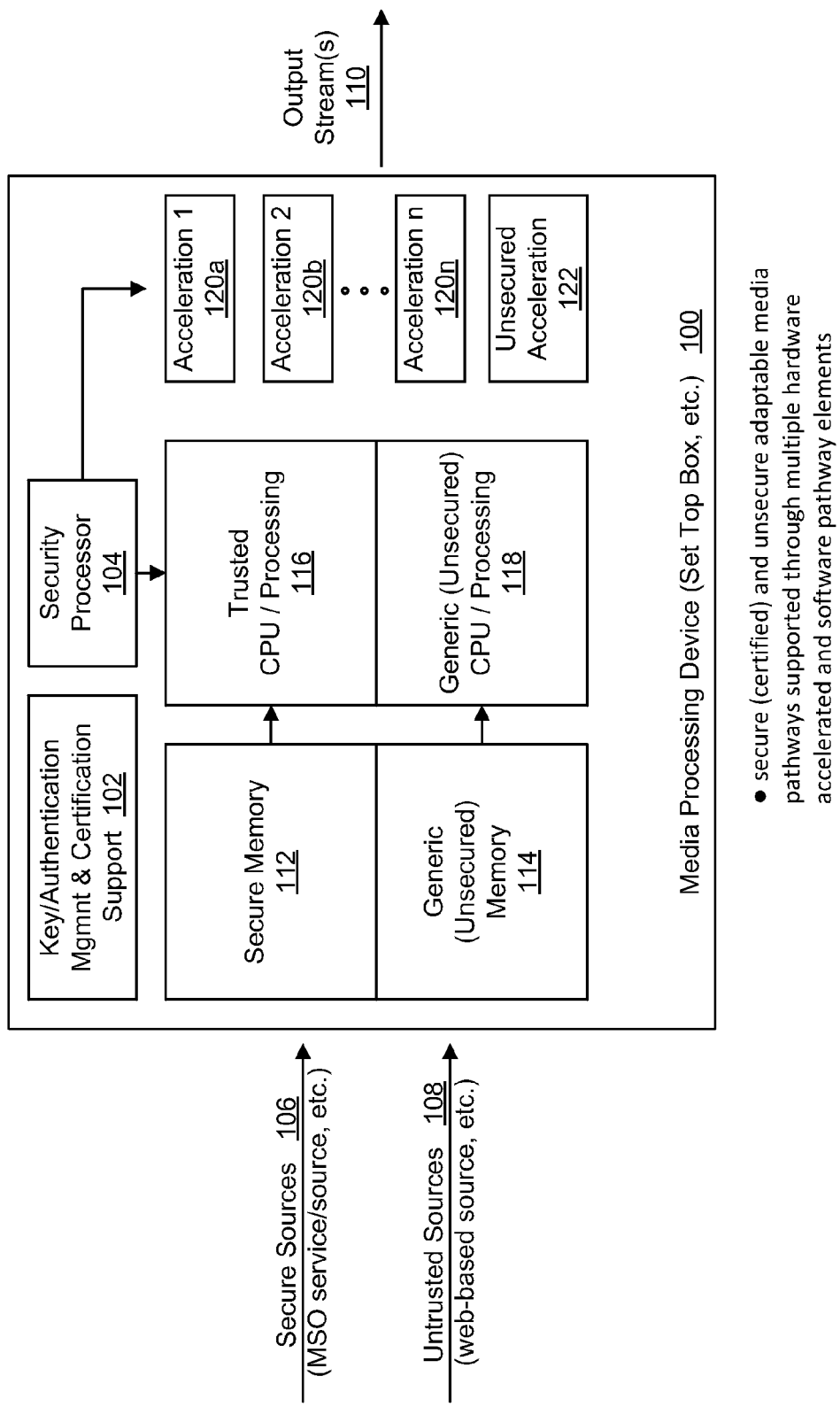
FIG. 1 illustrates a media processing device having a key management and certification support system in accordance with an embodiment of the present disclosure.

Referring now to FIG. 1, a media processing device 100 having a key management and certification support system 102 in accordance with an embodiment of the present disclosure is shown. The key management and certification support system 102, in conjunction with other device resources, operates to establish secure/certified and unsecure media pathways supported through multiple hardware accelerated and software pathway elements. For example, key management functionality may entail associating different keys with different functions, enabling or controlling certain interfaces, controlling how keys are generated, stored and accessed, etc. In addition, the key management and certification support system 102 can register certified CA and DRM systems and associated pathways and permitted operations in the media processing device 100. The security processor 104 may service pathway configuration requests from the key management and certification support system 102, and may be further operable to detect attempts from the restricted operating system environment to exploit the media pathway or nodes thereof in an unauthorized manner, restrict access to a certified pathway, etc.

In operation, processing of content and application software from trusted sources 106 (such as service operator) may be restricted to trusted or certified pathway components such as secure memory 112, trusted/secure processing circuitry 116, and one or more secure hardware/software acceleration functions 120a-n in order to generate an output stream(s) 110. Likewise, processing of content and application software from untrusted sources 108 (such as certain web-based sources) may be restricted to untrusted components such as generic or unsecured memory 114, generic or unsecured processing circuitry 118, and unsecured hardware/software acceleration functions 122. Depending on requisite security levels and other considerations, the effective boundaries between trusted and untrusted components may fluctuate in a dynamic manner as described more fully below.

In a media processing device 100 capable of supporting multiple hardware accelerated and software pathway elements, an entire secure or unsecure pathway can be adaptively constructed and adapted from pathway configurations providing, for example, maximum hardware acceleration and highest output quality to non-accelerated, low output quality. Each pathway node may have one or more software and/or one or more hardware underpinnings that enable servicing of multiple simultaneous media streams.

Figure 2:
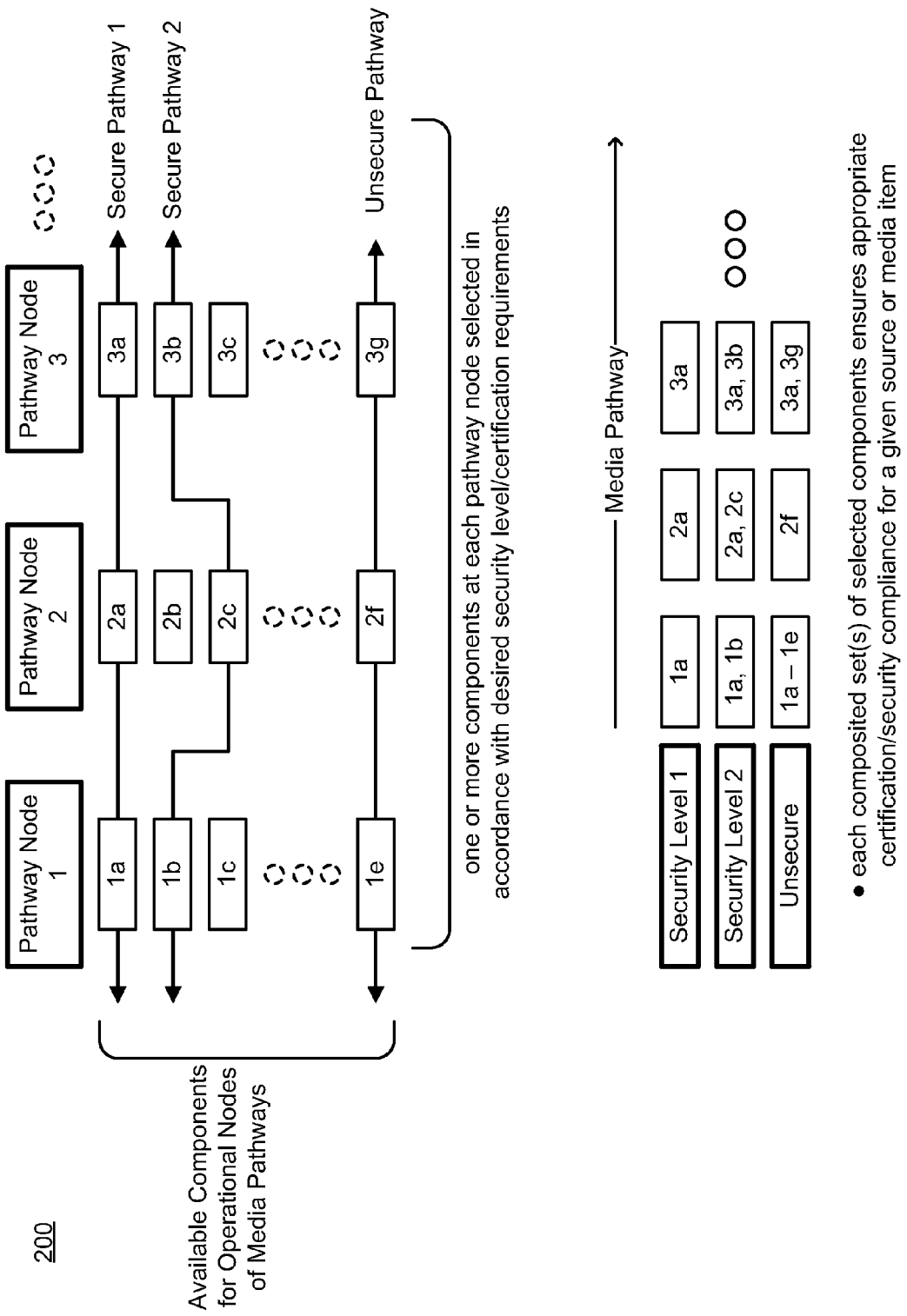
FIG. 2 illustrates secure and unsecure pathways established in accordance with an embodiment of the present disclosure.

FIG. 2 illustrates secure and unsecure pathways established in accordance with an embodiment of the present disclosure. In this embodiment, hardware/software components at each operational pathway node are selected in accordance with a desired level of security 1-3. In general, each security level corresponds to a particular certification service boundary definition(s) and key/authentication and security management scheme for managing resources such as hardware acceleration functions and software API's. For example, a security level may relate to a copy-protection certification scheme that requires a certain guaranteed amount of secure memory and processing resources.

Selection and management of the respective components within the device or system to effectuate delivery of signals or media may be made based upon the secure or unsecure nature of a component, current or anticipated availability of components, historical availability of components, the performance level and power consumption of components, etc. Different sets of components may be adaptively employed to ensure composited compliance with one or more security/compliance constraints. Such constraints may be applied, for example, on a source or content specific basis to establish multiple secure and unsecure pathways such as described more fully below in conjunction with FIGS. 3A and 3B.

Figure 3A:
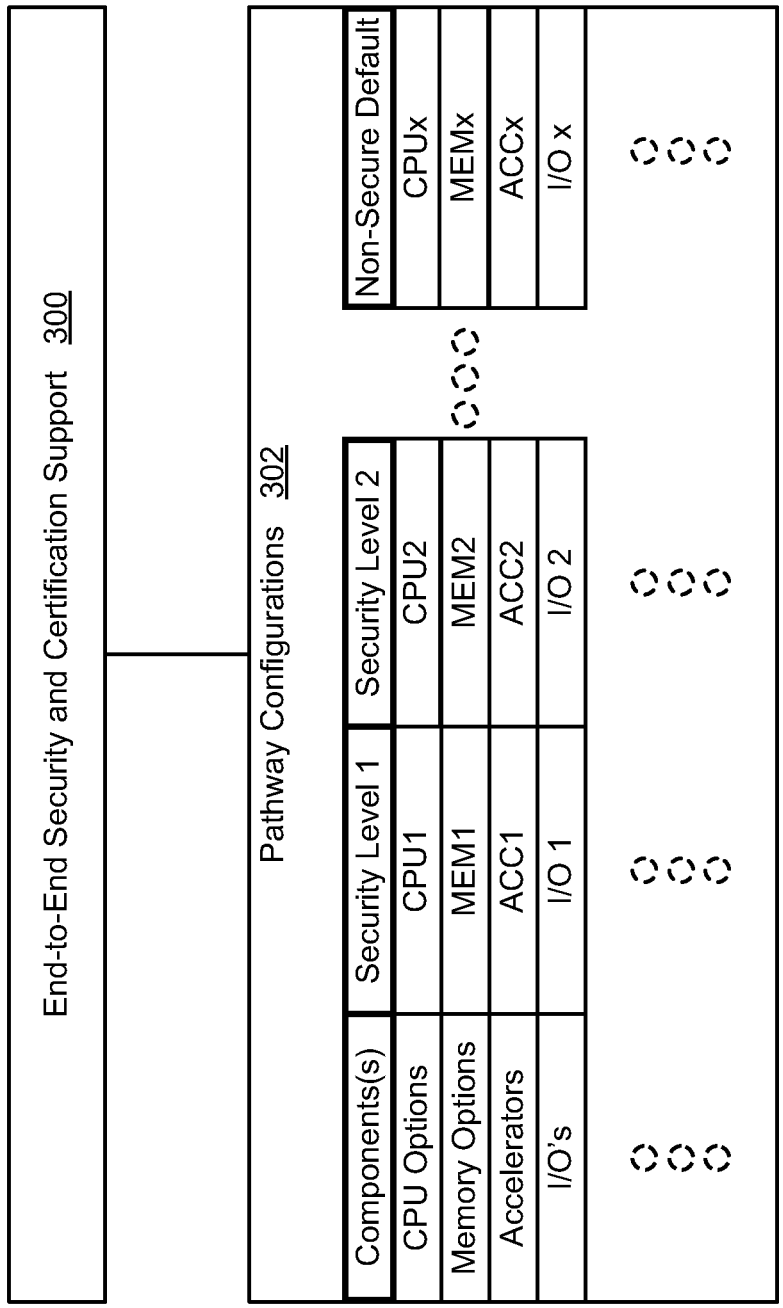
FIG. 3A illustrates exemplary pathway configurations in accordance with an embodiment of the present disclosure.

FIG. 3A illustrates exemplary pathway configurations 302 in accordance with an embodiment of the present disclosure. In this embodiment, selection of components that form the pathway configurations corresponding to a given security level is governed by end-to-end security and certification support 300. Available components of a device may include, by way of example and without limitation, CPU/processing options, memory options, input/output interfaces, software APIs, hardware acceleration functions for performing video encoding, video decoding, rendering of 2D and 3D graphics, digital rights management, encryption, decryption, etc. Some components may perform or enable multimedia functionality such as audio/video capture, format conversion, playback, saving and streaming.

In some embodiments, it is noted that components may have associated quality and security characteristics. The security characteristics may involve specific functionality within such component, but may also involve the underlying system security. For example, a given pathway node may have a certified, secure dedicated hardware component, or a certified, secure software component if running on underlying secure hardware (e.g., a secure processor). If running on unsecure hardware, the same (or nearly so) secure software component might be deemed only partially secure or unsecure. Security levels of currently available pathways might also be constrained, and dynamic pathway adaptations may be triggered by various limitations or resource competition.

In one example, depending on the multi-stream demands, dynamic adaptation of overall resource pathways can be performed to support, for example, simultaneous decoding, encoding or transcoding pathways. Further, certain device and framework functional blocks (including hardware acceleration components) can have multiple processing options (hardware, software and combinations thereof) which may each coexist and be supported with duplicate counterparts (e.g., hardware copies and software instancing). Each such block can have particular security and performance quality characteristics. Based upon such characteristics and current availability (in view of other pre-existing stream pathways), further pathways can be constructed and dynamically adapted having various overall performance and security qualities. So long as an end-to-end pathway meets minimum security requirements, such as imposed by an application, a service operator or content provider, a pathway may be commissioned to establish or replace a current pathway.

Figure 3B:
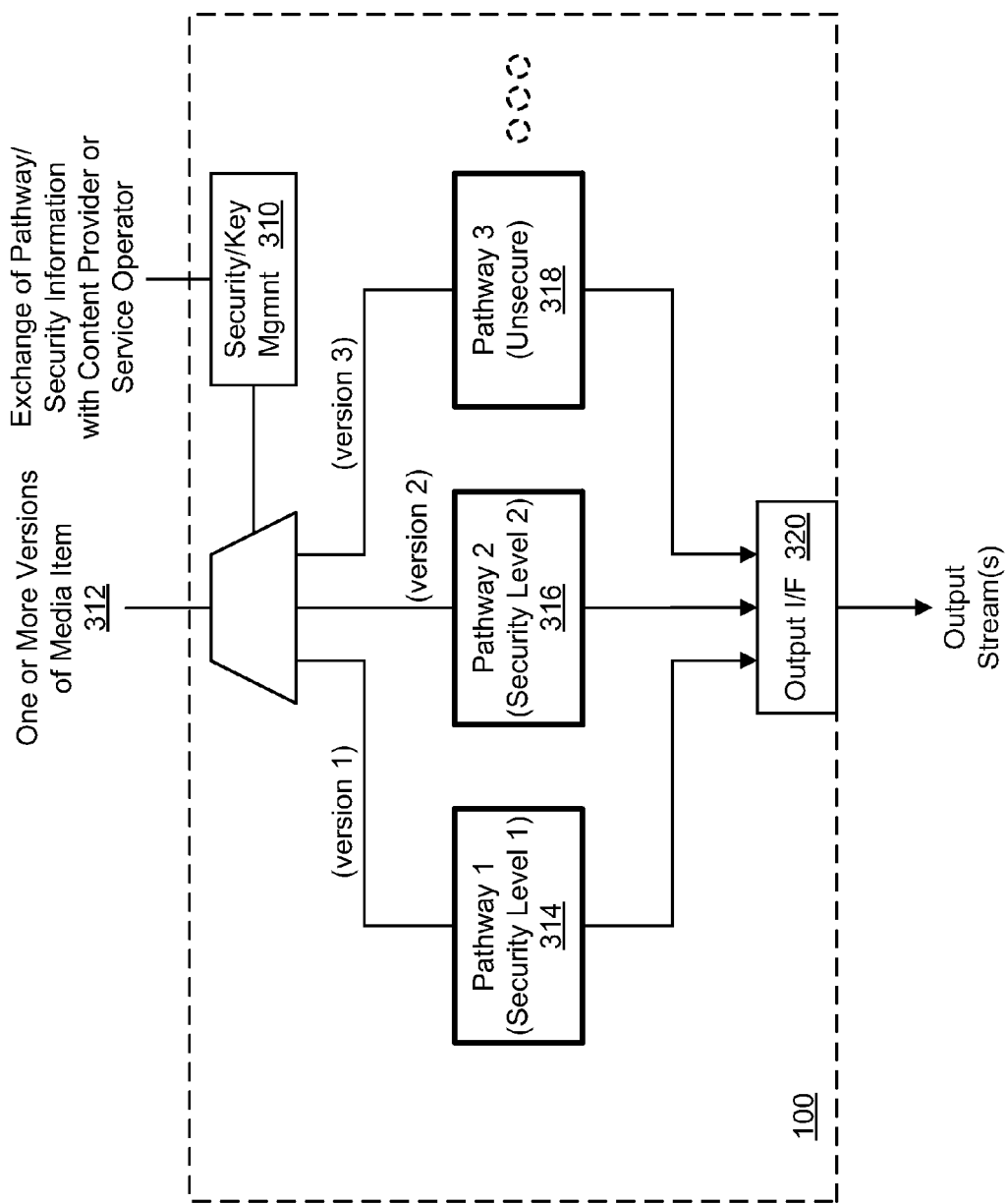
FIG. 3B illustrates media pathways of differing security levels in accordance with an embodiment of the present disclosure.

FIG. 3B illustrates media pathways of differing security levels in accordance with an embodiment of the present disclosure. In this embodiment, security and key management functionality 310 operates to establish first and second secure pathways 314 and 316 providing a first and second level of security, respectively, as well as a third, unsecure pathway 318. Various pathways may be selected for simultaneous processing and delivery (at an output interface 320) of one or more versions of a media item 312 to one or more recipient devices.

In one example, a service operator or content provider may simultaneously deliver multiple versions (perhaps of different quality) of a media item or broadcast for delivery over a "platinum" pathway, a "gold" pathway and an uncertified pathway. In addition, different versions (e.g., versions 1-3) of a media item may be available supported by differing levels of security or quality of service (QoS). For example, a high definition or 3D version of a movie may have higher security requirements than a lower resolution version of the movie. In certain embodiments, if the media processing device is unable to support delivery of a high definition version of a media item, the item might be delivered via a lower security pathway that utilizes transcoding functions to produce a lower quality version that can be delivered by the device. Alternatively, a media source or content provider may provide the differing versions of a media item for selective or adaptive delivery based on the characteristics (such as QoS) or security level of an available media pathway. Further, content or portions of content from a particular media source may be deliverable via a relatively unsecure pathway. For example, a movie streaming service may place no restrictions on movie trailers, the first few minutes of a movie, lower resolution versions of a movie, etc.

It is also noted that security requirements relating to a particular media item may be updated or modified over time. That is to say, pathway selection and adaptation may be based upon characteristics of a media item, media recipient, media source, characteristics of other media streams in a multi-stream environment, pathway component availability, overall device performance, etc., that may vary over time such that any given consideration may have a relatively higher weight at one time and a relatively lower weight at another time. In addition, different respective considerations may be employed at different respective times.

In some implementations, a media processing device might offer multiple secure and unsecure media pathway constructs from which a subset might be acceptable for a particular media item or media stream delivery. As additional streams are added, prior streams may limit the overall acceptable subset. Pathway adaptation and arbitration may cause an ongoing stream to use a different media pathway construct to make room for the new stream. Pathway acceptability may be determined and managed by the media source, media processing device, or by the content itself (or related metadata).

In addition to associated security characteristics, components in a pathway construct may have inherent output quality characteristics. Thus, an acceptable pathway from a security standpoint may carry with it a corresponding quality. For example, a relatively low security pathway might be limited to use with dated movie releases, lower resolutions or frame rates, embedded or overlaid advertising, etc.

As will be understood, the embodiments of disclose described herein may apply to both upstream and downstream communications. More specifically, an upstream pathway portion, a downstream pathway portion and a middle portion including a media processing device may be configured in accordance with end-to-end security requirements. Alternatively, or for a given media item, portions of a media pathway configuration may have differing levels of associated security, such as a secure upstream portion and a relatively unsecure downstream portion (possibly involving a second tier of certification or an uncertified mode of operation). As will be appreciated, many other combinations are possible.

In one such example, a pay-per-view type of media stream requiring full end-to-end security may be interrupted by changing a channel to a normal broadcast television channel. This channel may entail full service operator head-end to set top box security, but allow unsecure set top box to television media delivery. Tuning the channel again to (or otherwise selecting) a freely distributed Internet video source might permit fully uncertified and unsecure media pathways from a server source to the television. Similarly, interacting with the set top box to select a PVR source or content from a tethered DVD player might permit use of fully uncertified/unsecure pathways. As noted, the imposition/permission of available security levels might be dictated by the media itself (or in associated metadata) or managed by the media source.

In certain implementations, a content provider may evaluate downstream security capabilities and offer multiple pathway constructs along with various pricing options. Upon user selection (e.g., via interaction with a set top box), a particular pathway construct may be enabled. Further, an interface may be provided to indicate active pathway options. Selection of an additional media source might trigger such interface to, for example, prioritize one pathway construct over another, force a PVR "non-real time" delivery (postponed viewing), increase security and cost associated with a particular pathway construct, etc.

Figure 4:
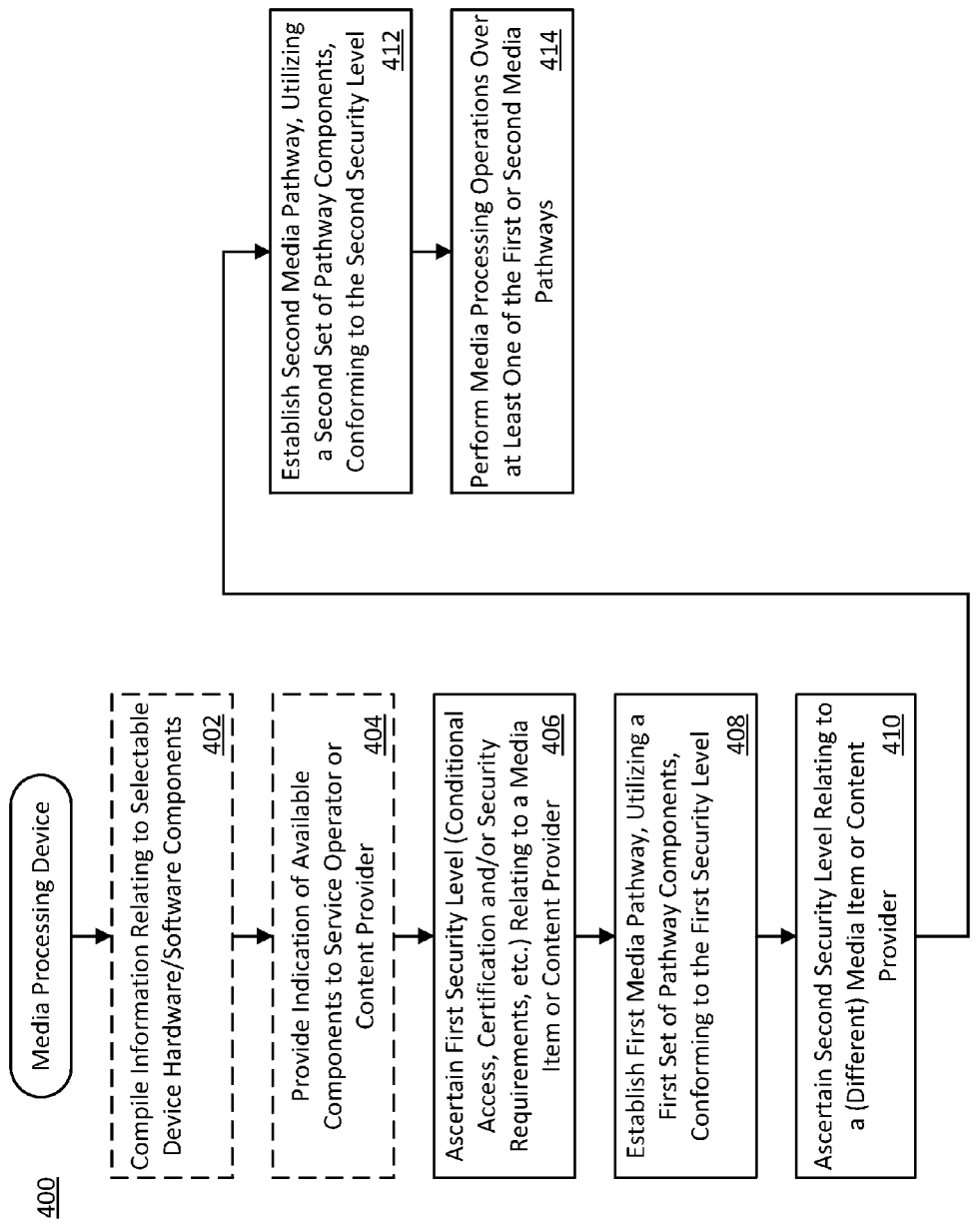
FIG. 4 is a logic diagram of a method for establishing multiple media pathways in a media processing device in accordance with an embodiment of the present disclosure.

FIG. 4 is a logic diagram of a method 400 for establishing multiple media pathways in a media processing device such as a set top box having a plurality of selectable pathway components in accordance with an embodiment of the present disclosure. In step 402, information is compiled relating to the selectable device hardware/software components (such as hardware accelerators, a/v decoders, DRM functions, decryption/encryption blocks, etc.). The information may be tabulated or otherwise compiled for use by the device and/or third party. Next, in step 404, an indication of available components is provided, for example, to a service operator or content provider. The recipient may respond by generating information for download (in step 406) including, by way of example, conditional access, certification and/or security requirements corresponding to available components.

The downloaded information may correspond to a first of a plurality of pre-established security levels. In various embodiments, for example, the desired level of security may correspond to requirements of an established or industry standard certification or testing procedure, requirements of a conditional access system utilized by a service operator, etc. Similarly, the desired level of security may correspond to a certification requirement for processing and delivery operations involving a particular content/media item or class of content/media items.

In step 408, a first media pathway conforming to the first level of security is established from a first set of pathway components. Next, in step 410, a second security level relating to a media item (which may be a completely different media item or different version thereof than a media item addressed in step 406) of content provider is ascertained. This second security level is utilized in step 412 to establish a second media pathway from second set of pathway components. In step 414, media processing operations are then performed over at least one of the first or second media pathways.

Figure 5:
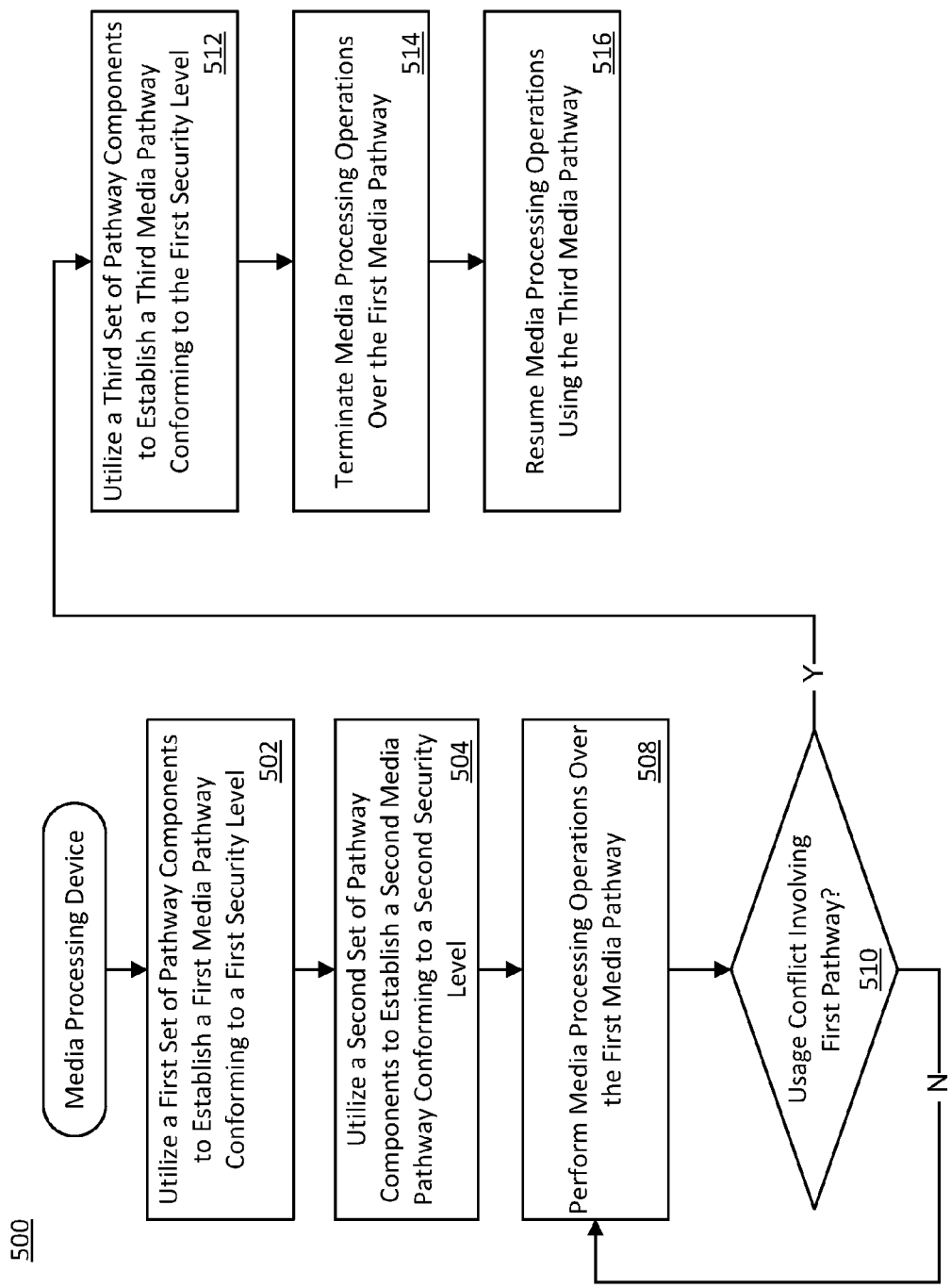
FIG. 5 is a logic diagram of a method for dynamically establishing alternate media pathways in accordance with an embodiment of the present disclosure.

FIG. 5 is a logic diagram of a method 500 in accordance with an embodiment of the present disclosure for dynamically establishing alternate media pathways in a media processing device such as a set top box having a plurality of selectable pathway components relating to operational nodes of the pathway. In step 502, a first set of pathway components is utilized to establish a first media pathway conforming to a first security level. Next, in step 504, a second set of pathway components is utilized to establish (at least) a second media pathway conforming to a second security level. Media processing operations (such as receiving and modifying a video or movie for delivery to a recipient device) are then commenced over the first media pathway in accordance with the first security level (step 508).

Media processing operations continue until completed or until detection of a component usage conflict or other problem with the first media pathway in step 510, a third set of pathway components (possibly overlapping with the first or second sets) is utilized to establish a third media pathway that conforms to or is derived from the first security level (step 512) and the media processing operations over the first media pathway are terminated (step 514). In addition to security, various factors may be utilized in the selection process for the third set of pathway components, including comparative expected power consumption, comparative performance levels, combinations thereof, etc.

In step 516, the terminated media processing operations are then resumed using the third media pathway. Such pathway adaptation may be necessitated, for example, by pathway deterioration, processing bottlenecks (perhaps due to simultaneous multi-stream processing), processing node unavailability, costs, per the direction of a viewer, etc. Further, adaptive pathway transitions may require quality or performance downgrades or upgrades.

The following Figures illustrate integration of untrusted software and software frameworks (such as an Android framework) with secure operating system (OS) kernel environments within a secure device (such as a certified set top box device) in accordance with various embodiments of the present disclosure. In general, an OS kernel may be viewed as the heart (or ring 0) of the operating system, providing an interface between system hardware components and the rest of the operating system and installed applications. As described more fully below, a secure software abstraction layer is provided to isolate access to underlying software, hardware and secure components of the device.

Communications and data exchanges between untrusted software/frameworks and a secure OS kernel may occur via a secure access layer or interface comprised of a secure access client and secure access server (for example, elements 606, 612 and 616 of FIG. 6) that support an application programming interface (API) and secure inter-process communication (IPC) calls or kernel drivers. In certain embodiments, the secure access client may be part of or accessible by a framework, while the associated secure access server is incorporated in a secure operating environment or executed as a secure kernel module. In operation, the secure access interface may help prevent system breaches or destabilization resulting from bad data or parameters by performing, without limitation, parameter validation/checking and peripheral range checking through hardware (when applicable), handle validation, direct/indirect heap pointer validation, heap isolation, and release of hardware resources following termination of a restricted process. The secure access server may limit access to server side libraries and return errors in response to invalid or illegal parameters passed by clients. The secure access interface may further perform watchdog functions to free resources reserved for runaway or unstable clients.

Software frameworks may support varying degrees of collaboration and dependencies between applications. However, the interfaces used by applications to provide services and communicate with other applications or an underlying operating system must be secured to defend against breaches and general malfeasance. As noted above in the Description of the Related Art, and without rigid hardware isolation and separate execution environments, the potential for execution of unauthorized code from an untrusted framework may compromise overall system security and negatively impact established certified or secured pathways absent methodologies and architectures (e.g., a secure access server) such as those described herein.

Figure 6:
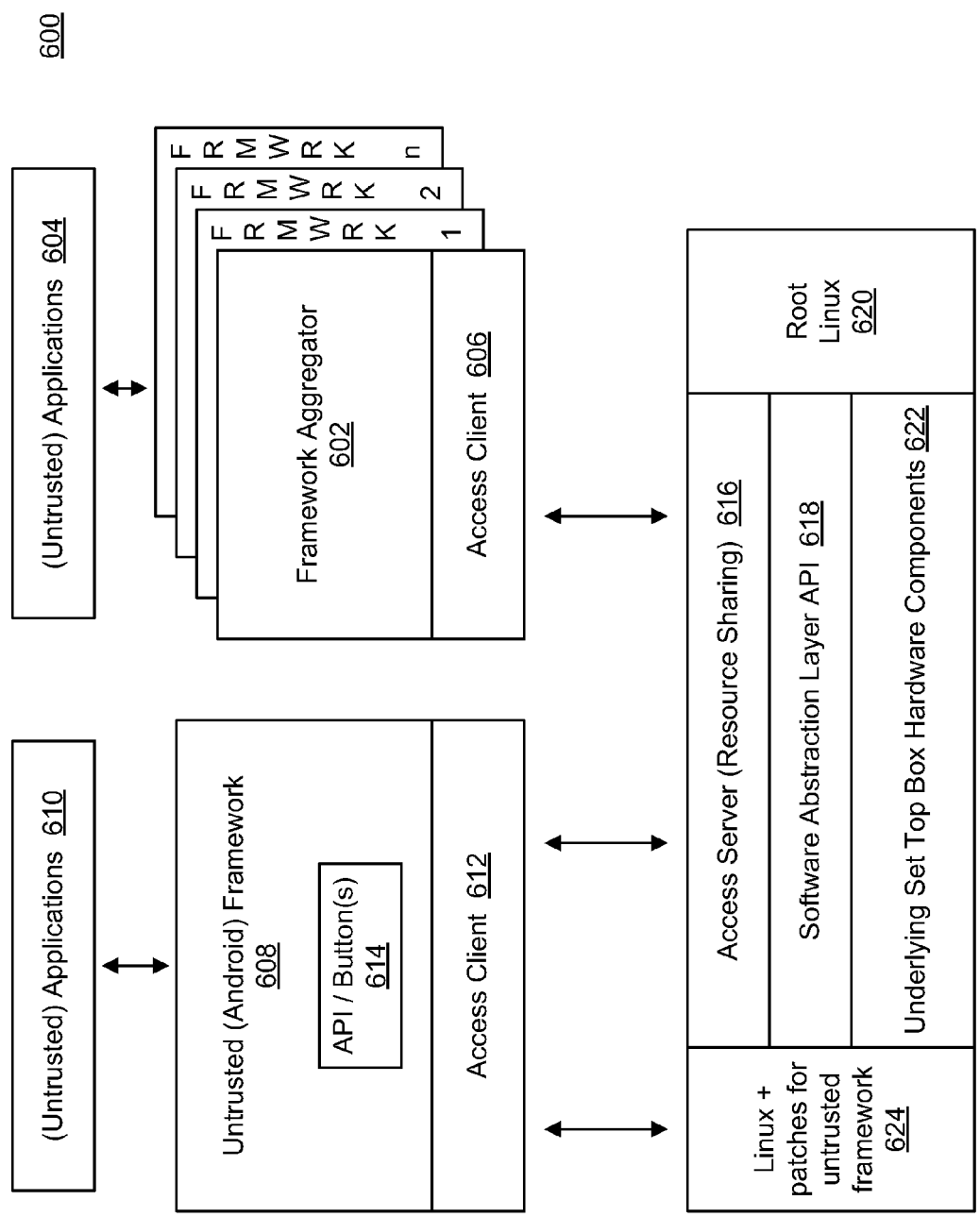
FIG. 6 illustrates an untrusted framework and a framework aggregator as clients of a secure operating system environment in accordance with various embodiments of the present disclosure.

Referring now to FIG. 6, an untrusted framework 608 and a framework aggregator 602 as clients of a secure operating system environment in accordance with various embodiments of the present disclosure is shown. In the illustrated embodiment, the framework "aggregator" 602 may be employed to embrace and extend operation with a wide variety of frameworks 1-n in order to support a wide variety of (untrusted) applications 604. In this manner, for example, a service provider can provide secure access to system resources to third party frameworks and other "middleware" offerings. Such offerings may include, by way of example and without limitation, Adobe Air, Adobe Flash, Apple iOS, Microsoft Silverlight, Java applets, and like side-by-side technologies. The framework aggregator 602 may include a set of tailored operating system libraries and HTML capabilities to support such technologies, as well as user interface web engine access, etc.

In certain embodiments, user interfaces supported by the framework aggregator 602 may enable a user to launch applications supported by the untrusted framework 608. For example, an Android framework 608 and/or framework aggregator 602 may offer a series of APIs or buttons 614, including an Android button that provides a visual display of available Android applications. Further, the Android framework 608 and framework aggregator 602 may share a graphics screen. In this manner, it may not be necessary to port functionality into the Android framework 608 that might otherwise be necessary. It is noted that in a given device, an Android framework 608 may be built using a different tool chain than that utilized by other frameworks supported by the framework aggregator 602, and support execution of a different set of applications 610.

In the illustrated embodiment, the untrusted framework 608 and the framework aggregator 602 can access a secure or trusted root operating system—such as Linux-based operating system 620—and/or underlying hardware, such as secure set top box hardware components 622, via an access server 616 operating in concert with access clients 606 and 612 and a software abstraction layer API 618. In this illustrated embodiment, an access client 612 enables secure communications between the untrusted framework and access server 616, while the framework aggregator 602 is similarly supported by an access client 606.

A complete or partial Linux operating system instance 624, including any necessary software patches, is provided to support execution of the untrusted framework 608, and the access client 612 may further function to govern communications between the untrusted framework 608 and the complete or partial Linux operating system instance 624. Linux kernel components of an Android software stack may include, for example, a display driver, a USB driver, a keypad driver, a WiFi driver, an audio driver, power management, a binder (IPC) driver, a Bluetooth driver, a flash memory driver, etc. In addition, the framework 608 may include an API or one or more buttons 614 that enable, for example, a visual display of available applications 610 (which may be executed on the untrusted framework 608 using, for example, application IPC calls).

In one embodiment, execution of the untrusted framework 608 (including components thereof, as well as untrusted applications 610) is performed using process isolation techniques. Such process isolation techniques may entail, for example, utilizing virtual address space where the address space for a first process is different than that of a second process. Inter-process memory access may be prohibited, or tightly controlled in certain implementations (e.g., where system policies permit processes to collaborate over IPC channels such as shared memory or local sockets).

Figure 7:
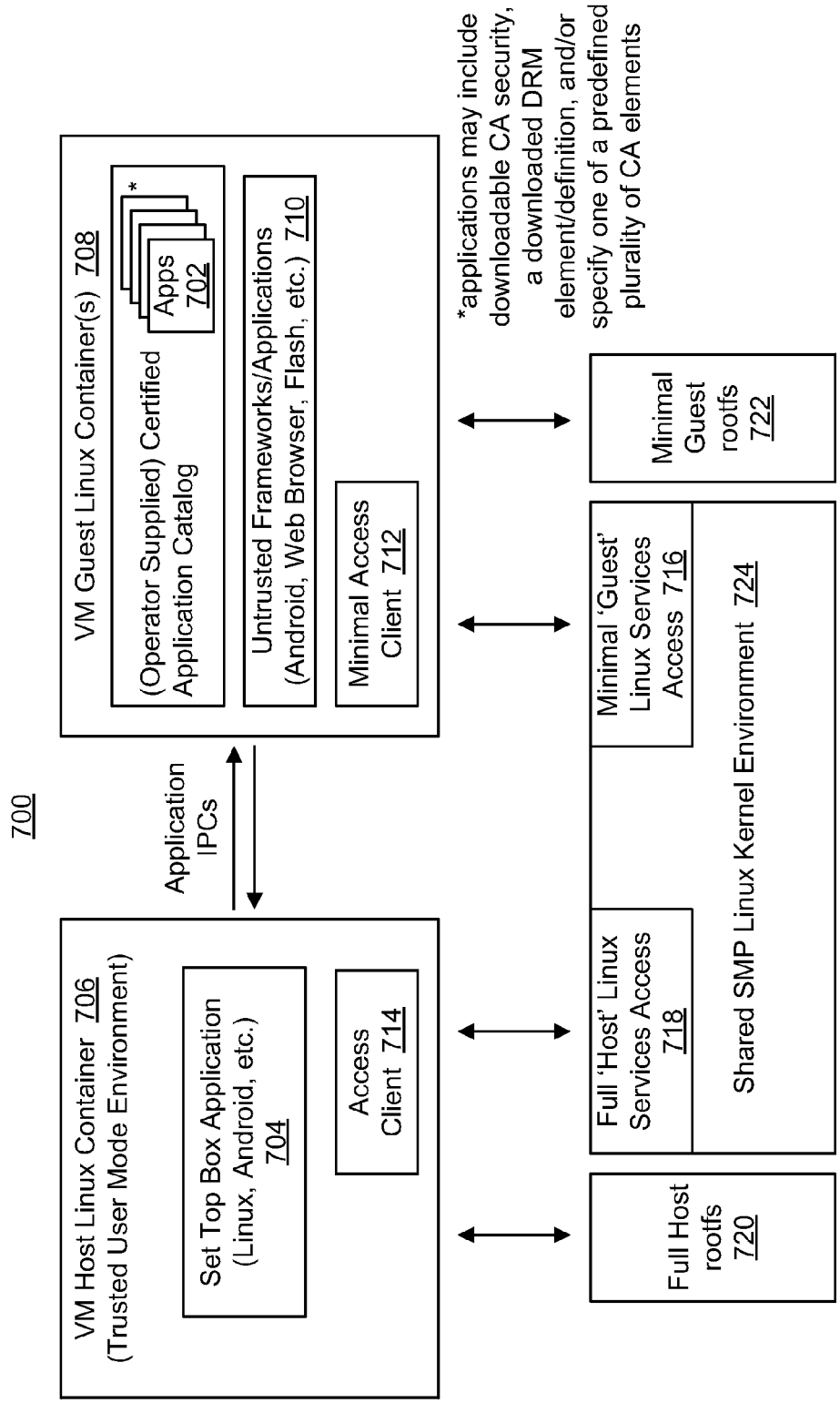
FIG. 7 illustrates a set top box architecture utilizing certified applications in accordance with various embodiments of the present disclosure.

FIG. 7 illustrates a set top box or other secure architecture 700 utilizing certified applications 702 in accordance with the present disclosure. In the illustrated embodiments, the certified applications 702 may be preinstalled or downloaded, for example, from a catalog of certified applications provided by a service operator or cloud-based source. Such applications might include, by way of example, media streaming applications (e.g., Netflix), gaming applications, web browsing applications, iOS-based applications, Android applications, etc. In some embodiments, it may be necessary to incorporate or download additional operating systems to support corresponding classes of certified applications. Alternatively, different certified versions of a given application may be made available to support a variety of installed operating systems and/or frameworks 710. Certified applications 702 may be executed in one or more virtual machine containers 708 as described more fully below in conjunction with FIG. 8.

In the illustrated embodiment, untrusted client applications and frameworks interact with secure portions of an underlying set top box platform—including the set top box application 704, certified (operator supplied) applications 702 and secure Linux kernel environment 724 through application IPC calls and an access minimal client 712 that accesses minimal "guest" Linux services access 716. Likewise, applications in a trusted user mode (or "privileged") operating system environment receive full access to "host" Linux services access 718 via an access client 714. The trusted user mode environment can be supported by a full host root filesystem 720, while a minimal guest root filesystem 722 on a separate partition or disk can support the untrusted user mode (or "restricted") operating system environment.

In some embodiments, certain resources of a set top box platform, such as media processing and hardware acceleration resources (for audio/video encoding and decoding, rendering of 2D and 3D graphics using a standardized API (such as Open Graphics Library or "OpenGL"), DRM, encryption/decryption, etc.) and networking interfaces, may be accessed by untrusted client applications/frameworks 710 through IPC calls communicated through network sockets. Likewise, events such as IR control signals may be communicated from a set top box platform to untrusted client applications/frameworks 710 through IPC calls (such as a call into an Android API or button).

In one exemplary embodiment, the primary set top box application 704 is constructed as an Android application executed in a virtual machine container(s) 706. Depending on the capabilities of the relevant Android framework, non-standard API's or libraries may be required to support certain set top box functionality, such as PVR, picture-in-picture, transcoding, and channel tuning operations. Further, this approach may require special interfacing (e.g., passing a string to an interface to create an encode path as part of a hardware call) or provision of non-standard functions (or even applications) to address services and functions that may be lacking in a relevant framework or required for certification. For example, an Android framework might be extended to include non-standard functionality—without negatively impacting compatibility—by providing services that are "hidden" under the Android porting layers and receive and interpret uniform resource identifiers ("URIs") passed through such layers.

In other embodiments, instead of an end-to-end security definition being managed by the source or being defined by the content itself (or associated metadata), each application that is downloaded (or preinstalled) includes a full security definition. For example, each application may have its own downloadable conditional access security (dCAS) or downloadable DRM element/definition. A corresponding certification process might entail, for example, certifying a part of an overall secure pathway, with one or more applications providing the final portion of the certification. Alternatively, a predefined plurality of conditional access mechanisms may be provided, with a (downloaded) application defining which mechanism is to be used. It may then be possible to certify a secure "boundary" without regard to the conditional access requirements of a particular company or media.

In various embodiments, a set top box or like device may exchange capabilities with other devices in a media consumption network (e.g., PVR's, DVD players, access points, televisions, computing devices, smartphones, etc.) to compare against the requirements of an application. Once this is done, the application may select which one or more modes of operation, if any, that it will permit. If the set top box cannot support such modes (due to resource competition or otherwise), such modes become unavailable. If available a set of modes of operation can be selected and dynamically switched to other of such modes on the fly during a media stream delivery, which may require coordination with the application or the source to support the transition (possibly requiring quality changes in the media stream).

Figure 8:
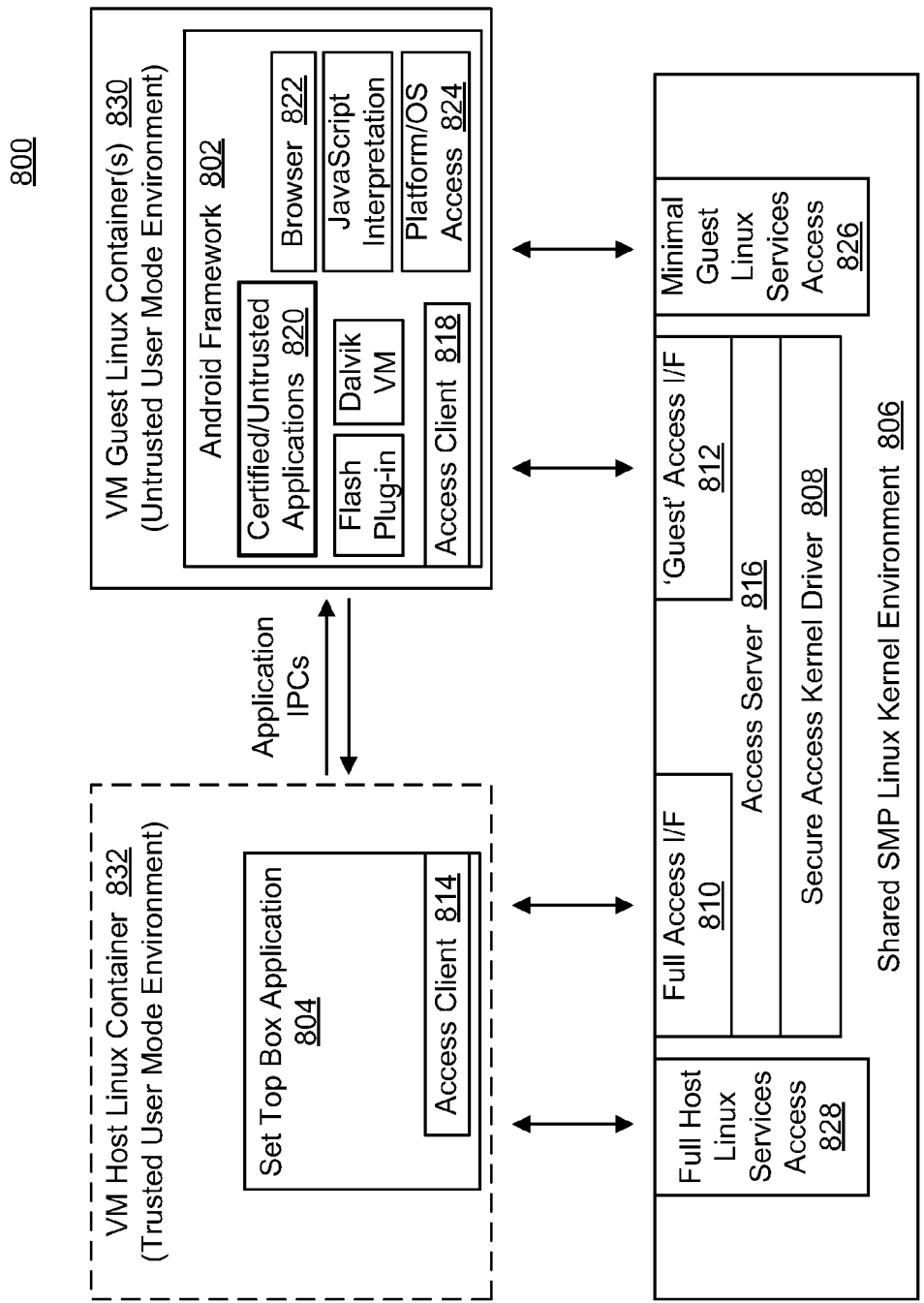
FIG. 8 illustrates an untrusted framework as a client of a set top box application in a virtualized environment in accordance with various embodiments of the present disclosure.

FIG. 8 illustrates an untrusted framework 802 as a client of a set top box application ("STB application") 804 in a virtualized environment in accordance with various embodiments of the present disclosure. As shown, a STB application 804 is provided to perform basic operations of a set top box 800, and interfaces with an untrusted "client" framework such as an Android framework 802. In this embodiment, the STB application 804 is executed in a secure or privileged Linux operating system kernel environment, such as a Symmetric Multiprocessing (SMP) Linux kernel environment 806, that includes a secure access kernel driver 808 and an access server 816 that includes a full access interface 810 for use by the STB application 804, and a more limited guest access interface 812 for use by the Android framework 802 via an access client 818. The STB application 804 includes access client 814 functionality that supports communications with the full access interface 810 and enables the Android framework 802 to run as an untrusted client of the secure Linux kernel environment 806 using, for example, container-based virtualization. As may be appreciated, the client/server architecture allows untrusted processes to crash or terminate without compromising underlying hardware and causing system instability.

In addition to an access client 818, the Android framework 802 of the illustrated embodiment may include trusted/certified and/or untrusted applications and application support 820, JavaScript interpretation, browser functions 822, plug-ins (e.g., an Adobe Flash plug-in), and a Dalvik virtual machine. In some embodiments, certified applications 820 may be downloaded from or supplied by a service operator, content provider, cloud-based source or the like. The Android framework 802 further includes platform or operating system access functionality 824 that enables limited access to necessary components of the secure Linux kernel environment 806 through a minimal guest Linux services access interface 826.

A variety of virtualization techniques may be employed in various embodiments according to the present disclosure, including implementations utilizing virtual systems running on either a shared operating system kernel or separate operating system kernels. Selection of a particular approach may depend on the required level of isolation, as well as availability of processing and memory resources. In the illustrated embodiment, the untrusted Android framework 802 is executed in a first virtual machine (VM) guest Linux container(s) 830 (such as an "LXC" or Linux resource container) to provide further isolation from secure processes and resources. In this embodiment, the STB application may similarly operate in a second VM host Linux container 832 having full host Linux services access 828. Briefly, and in general, container-based virtualization (or operating system-level virtualization) allows a kernel to run with a plurality of isolated virtual machines or virtual environments installed on top of it. Each virtual environment may be dedicated to run a particular application, and is typically not a complete operating system instance, but rather a partial instance of the operating system that works with a virtualization layer (or hardware resource abstraction layer) in the host operating system kernel.

Although virtualization may mitigate the need for hardware separation of untrusted components, in certain embodiments multiple processors having different levels of security may benefit from virtual container constructs which operate wholly via one of such processors, while other containers may span multiple processors. In one such embodiment, a first processor(s) may be dedicated to execution of non-secure functionality, while a second, secure processor(s) may be dedicated to conventional STB functionality. In various alternate embodiments, an untrusted framework may be hardware sandboxed via, for example, non-processor hardware/peripherals, memory isolation from processors and/or peripherals, etc. Various other divisions between secure and untrusted software and hardware are contemplated (e.g., dividing an untrusted framework or applications themselves into a "trusted" portion and an "untrusted" portion), examples of which are described below. Further, by utilizing hardware and operating system virtualization features, multiple operating systems may run simultaneously on the same hardware.

Figure 9:
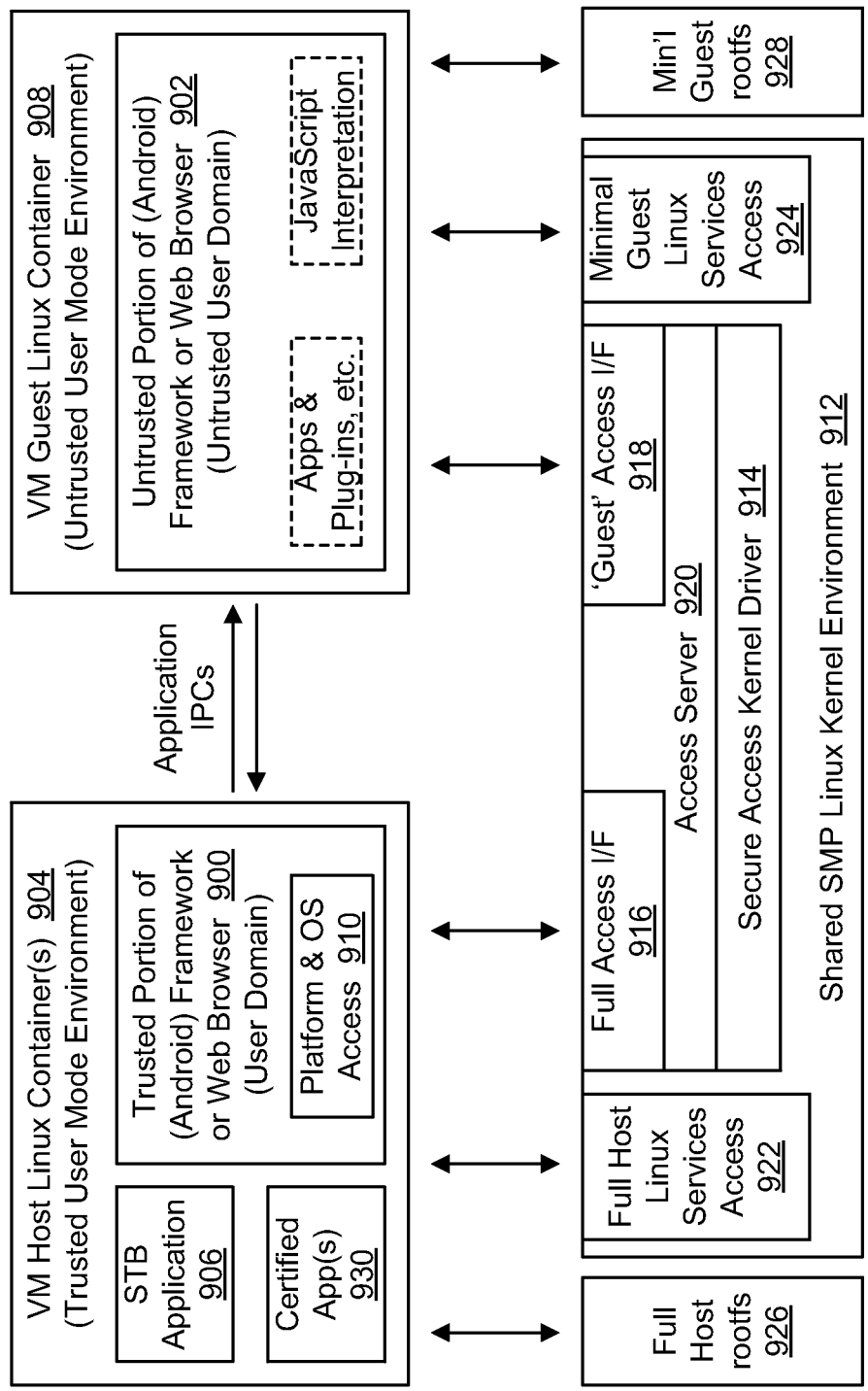
FIG. 9 illustrates partitioning of a framework into trusted and untrusted portions in accordance with an embodiment of the present disclosure.

FIG. 9 illustrates partitioning of a framework into trusted and untrusted portions 900 and 902 in accordance with an alternate embodiment of the present disclosure. In this embodiment, a trusted portion(s) 900 of a (Android) framework 900, web browser, etc., and a corresponding untrusted portion(s) 902 are executed in one or more separate virtual machine containers 904 and 908, respectively. The trusted portion 900 may include a secure platform and operating system access interface 910. In addition to the trusted portion 900, a set top box application 906, as well as trusted or certified applications 930, may operate in virtual machine container(s) 904.

Using an example involving a web browser, the portion of the browser that executes potentially unsafe Flash or JavaScript code (such as a rendering engine) can be executed in the "untrusted" virtual machine container 908 with limited file system and peripheral access, while the portion of the browser that has access to underlying platform hardware and sensitive operating system resources can be executed in one or more "trusted" virtual machine containers 904. In further embodiments, the trusted portion 900 may comprise a secure clone of a framework, or modified version of a framework that supports secure applications and/or secure portions of applications. In such embodiments, unsecure applications or portions thereof may be executed by portions of a framework residing in an untrusted or restricted user domain or container. Various approaches to hardware sandboxing may be employed to further isolate untrusted portions of a framework and to support restricted operating system domains or environments.

The secure Linux kernel environment 912 of this embodiment includes a secure access kernel driver 914 and an access server 920 that provides a full access interface 916 to support trusted user mode functionality and a guest access interface 918 to support untrusted user mode functionality. Full host Linux services access 922 and minimal guest Linux services access 924 are provided to the trusted and untrusted user mode environments, respectively. As above, the trusted user mode environment can be supported by a full host root filesystem 926, while a minimal guest root filesystem 928 on a separate partition or disk supports the untrusted user mode environment.

Figure 10:
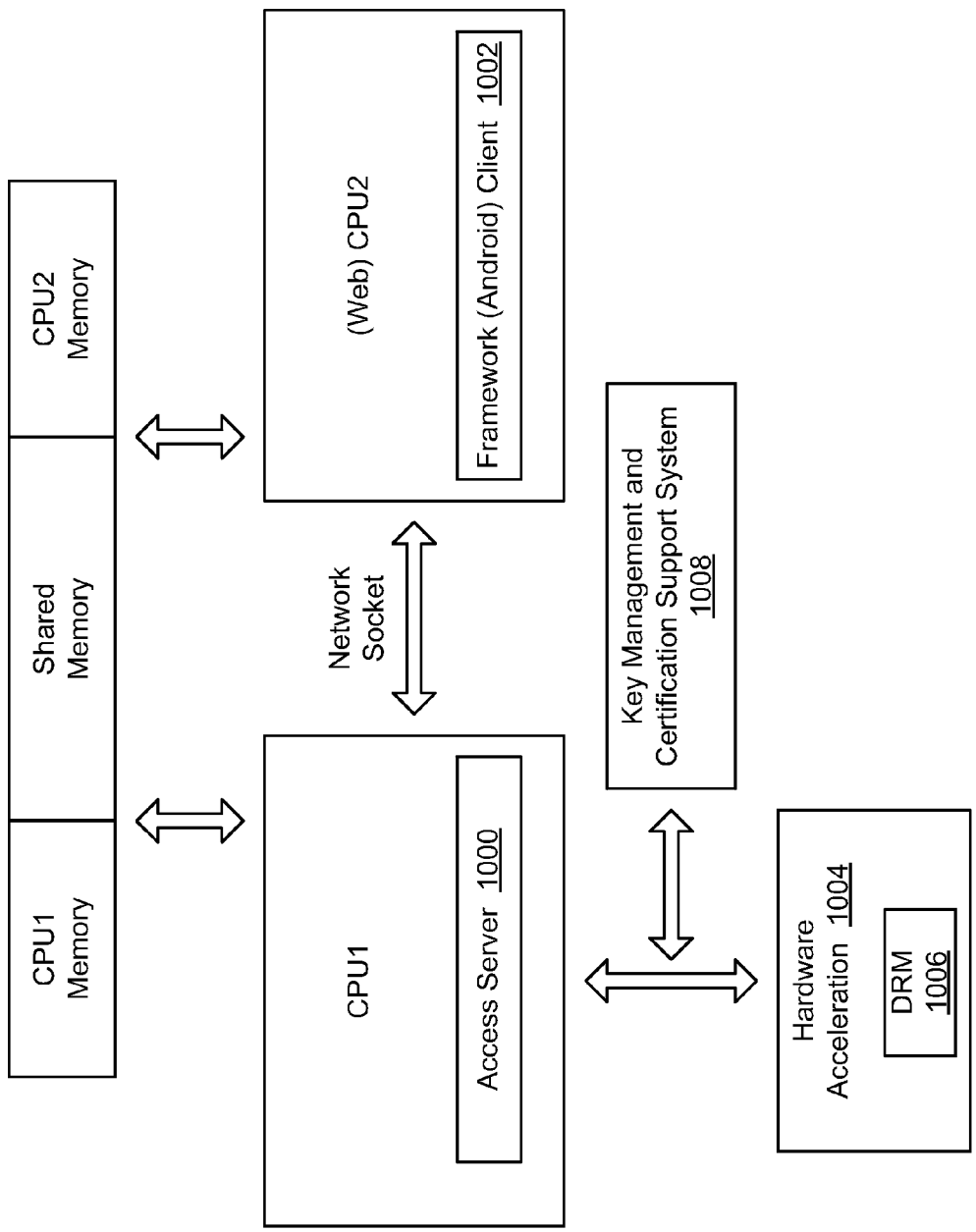
FIG. 10 is a block diagram of a multi-processor system supporting hardware segregation of operating system environments in accordance with various embodiments of the present disclosure.

FIG. 10 is a block diagram of a multi-processor system supporting hardware segregation of operating system environments in accordance with various embodiments of the present disclosure. For example, a first processor(s) CPU1 may be dedicated to conventional STB functionality and support a secure access server 1000, while a second processor(s) (web) CPU2 may be dedicated to execution of non-secure functionality and untrusted applications (e.g., an Android framework client 1002 or web browser). A trusted execution environment supported by CPU1 can limit access to certain core STB functionality, including hardware acceleration blocks 1004, DRM capabilities 1006, and the like. Access to and enablement of such components can be controlled by a key management and certification support system 1008, such as described more fully above.

In one embodiment, CPU1 and CPU2 are both segregated into separate and distinct zones when in a "sandboxing" mode. In another embodiment, the trusted CPU1 is set up having its own segregated regions of memory and also given access rights over some or all address ranges of memory mapped portions of CPU2. Generally, when operating in separate or segregated zones, environments or domains, the two CPUs operate on different applications, so that CPU1 executes one set of instructions, while CPU2 executes a different set of instructions. Segregation or separation of this nature is typically referred to as sandboxing or sandbox mode. The purpose of most sandboxing is to prevent one zone from accessing functionality in the other zone or to have controlled access of one zone into another. In some instances, both zones may be limited from having access to the other zone or only have controlled access between zones. In some applications, one zone may be regarded as a secure, privileged or trusted zone and the other as a restricted, non-secure or non-trusted zone, in which access by the applications operating on the non-secure zone are prevented or controlled from accessing certain applications running in the secure zone.

As noted above, a number of devices utilize multiple processors or processing cores to run separate programs, applications, etc. In a situation where one zone is not to have access to a second zone, one way to ensure this separation is by checking the accesses to the system memory. That is, by ensuring accesses that are allocated to CPU1 are not accessed by CPU2, unless the location of the access is a shared location, applications running on CPU2 may be prevented from breaching the functional separation. One way to achieve this protection is to provide an access check and access control to ensure that the correct processing module is accessing a permitted location for that processing module. In the illustrated embodiment, CPU1 and CPU2 may communicate directly through a network socket, IPC calls, etc.

Figure 11:
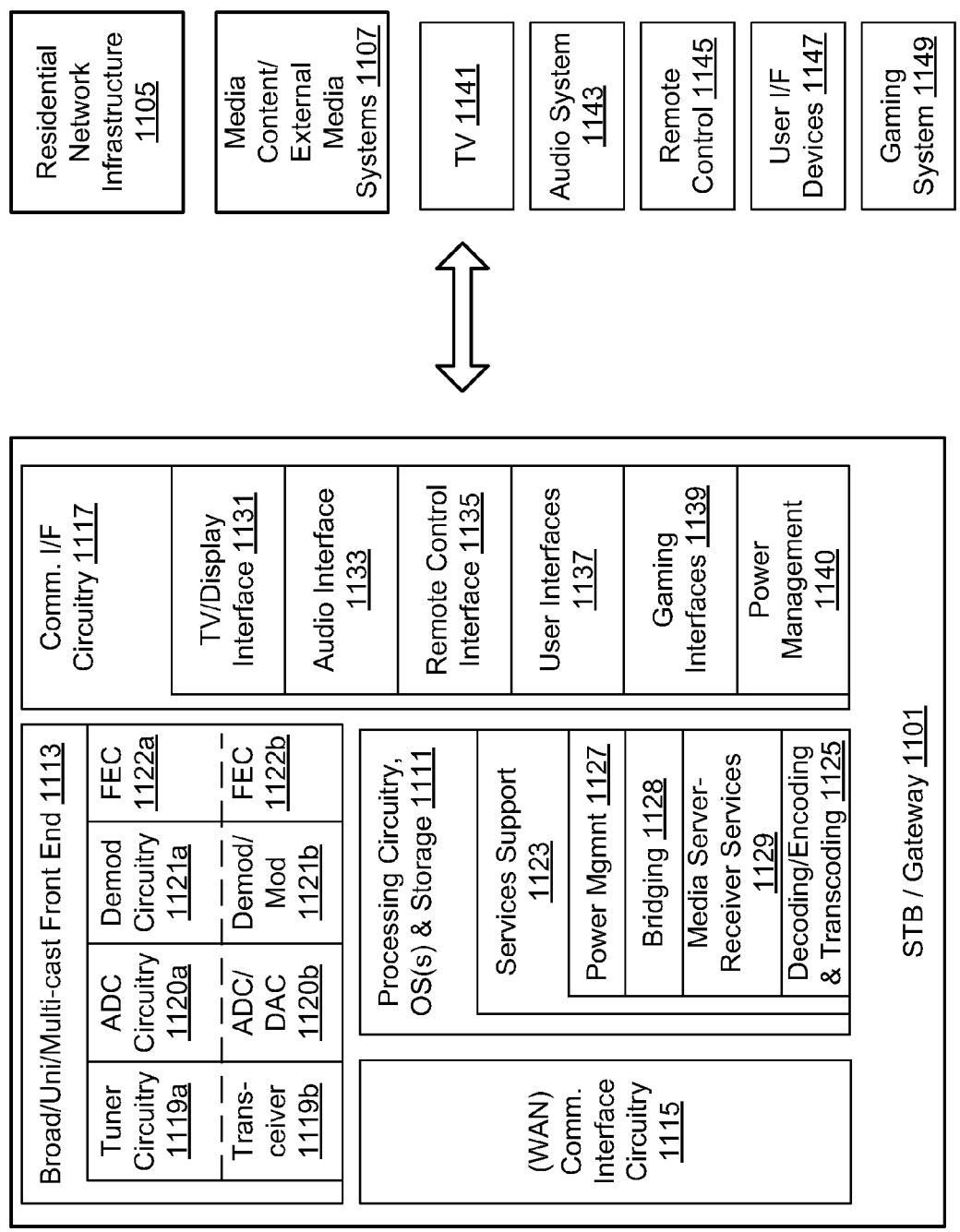
FIG. 11 is a schematic block diagram of a set top box (STB)/gateway (GW) in accordance with an embodiment of the present disclosure.

FIG. 11 is a schematic block diagram of a set top box (STB)/gateway (GW) 1101 in accordance with an embodiment of the present disclosure. The STB/gateway 1101 provides a number of functions, including conversion of signals from external sources into content that can be consumed by network devices. The STB/gateway 1101 may further operate as a gateway that supports unidirectional or bidirectional communications and bridging between network devices.

The STB/gateway 1101 of the illustrated embodiment interacts with a residential network infrastructure 1105 and external media systems 1107 via one or more wired and wireless networks/links. The wired and wireless networks/links may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links may comprise a multi-hop network utilizing a spanning tree protocol, direct wireless connections, peer-to-peer links, etc.

The external media systems 1107 may comprise, for example, one or more of cable, satellite and/or terrestrial televisions systems. Various headend equipment and services can be utilized by these systems, such as a cable headend that receives television signals for further processing and distribution, and may offer various other services such as internet connectivity and VoIP services.

The STB/gateway 1101 of the illustrated embodiment includes a broadcast/unicast/multicast front end 1113 that operates to receive uncompressed or compressed digital video, digital audio and other data signals, from either the external media systems 1107 or residential network infrastructure 1105, for further processing and distribution. The front end 1113 comprises tuner circuitry 1119a operable to isolate particular channels. Signals from the tuner circuitry 1119a are then provided to analog-to-digital (ADC) circuitry 1120a and demodulation circuitry 1121a for conversion into binary format/stream. Once in binary format, forward error correction (FEC) circuitry 1122a checks the integrity of the received binary stream. Audio, video, and data extracted from the binary stream may then be decoded (e.g., by decoding 1125) into formats suitable for consumption by downstream devices. It is noted that demodulation circuitry 1121a may support one or more modulation techniques, such as Quadrature Phase Shift Keying (QPSK), Quadrature Amplitude Modulation (QAM), Coded Orthogonal Frequency-Division Multiplexing (COFDM), etc.

The front end 1113 may be integrated into one or more semiconductor devices that may further support, for example, interactive digital television, networked DVR functionality, IP video over DOCSIS applications, and 3D graphics support. In addition, multiple tuner circuitry 1119*a* (including in-band and out of band tuners), ADC circuitry 1120*a* and demodulation circuitry 1121*a* may be provided for different modulation schemes and television standards (such as PAL, NTSC, ATSC, SECAM, DVB-C, DVB-T(2), DVB-H, ISDB, T-DMB, Open Cable).

In one alternative embodiment of the disclosure, functionality of the STB/gateway 1101 is performed by a smartphone or mobile computing device. In this embodiment, the "front end" 1113 comprises one or more wireless interfaces (including PHY and baseband functions), such as a cellular (3G, 4G, IMT-Advanced, etc.) or wide area network (HetNet, Wi-Fi, WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 1119*b*, analog-to digital (ADC) and digital-to-analog (DAC) circuitry 1120*b*, demodulation and modulation circuitry 1121*b* and FEC (such as turbo codes or LDPC codes) circuitry 1122*b*. Encoding, decoding and transcoding 1125 functions may be provided by processing circuitry and storage 1111.

The STB/gateway 1101 also includes (wide area network) interface circuitry 1115 for communicating with residential network infrastructure 1105 and/or external media system 1107. Through the communication interface circuitry 1115, the STB/gateway 1101 may communicate directly with upstream resources, or offer (bidirectional) bridged communications between such resources and devices (e.g., devices 1141-1149) coupled to the STB/gateway 1101.

In the embodiment of FIG. 11, STB/gateway 1101 interacts with a variety of devices 1141-1149 via communication interface circuitry 1117. For example, a television or display interface module 1131 communicates with a (digital) television 1141 or other media display device to relay television programming and enable available interactive media services. In certain embodiments, the television or display interface module 1131 might include a remote user interface (RUI) server. Similarly, an audio interface 1133 provides audio programming or audio library access to an audio system 1143.

The communication interface circuitry 1117 further comprises a remote control interface 1135 for receiving control signals from a remote control 1145. In addition to traditional remote control operations, the remote control 1145 may further offer voice and/or gesture control signals that are relayed or mapped to relevant consumer devices. User interfaces 1137 are also provided for communications with one or more user interface devices 1147. Gaming interfaces 1139 function to provide interactive communications with a gaming system 1149. Such communications may involve, for example, online, multiplayer gaming between members of a social network and/or external players in a gaming platform. Power management interface 1140 functionality is provided to enable power saving operations between devices 1141-1149.

The STB/gateway 1101 of the illustrated embodiment includes processing circuitry, operating system(s) and storage 1111 (components of which may be comprised of hardware, software, or combinations thereof), services support 1123, and decoding/encoding/transcoding functionality 1125 to support network interactions such as those described above. Services support 1123 in this embodiment includes various functions such as power management 1127, bridging 1128, and media server-receiver services 1129. Other traditional features of a STB/gateway may also be included. For example, the processing circuitry 1111 may include a system-on-a-chip or like device(s) that provide components such as a core processor, audio/video decoder, media processor/DSP, graphics core, encryption/decryption core, adaptive transcoding, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for supporting secure and unsecure media pathways options in a media processing device having a plurality of selectable pathway components, the method comprising:
   ascertaining a first desired level of security relating to a media item or content provider;
   establishing a first media pathway utilizing a first set of selectable pathway components of the media processing device that include a first set of software components and a first set of hardware components, the first media pathway conforming to the first desired level of security;
   ascertaining a second desired level of security relating to a media item or content provider; and
   establishing a second media pathway utilizing a second set of selectable pathway components of the media processing device that include a second set of software components and a second set of hardware components, the second media pathway conforming to the second desired level of security, the first set of software components differing from the second set of software components by at least one software component and the first set of hardware components differing from the second set of hardware components by at least one hardware component; and
   dynamically establishing a third media pathway utilizing a third set of selectable pathway components that include a third set of software components and a third set of hardware components, the third media pathway conforming to the first desired level of security, the first set of software components differing from the third set of software components by at least one software component and the first set of hardware components differing from the third set of hardware components by at least one hardware component.

2. The method of claim 1, further comprising:
   performing media processing operations over at least one of the first or second media pathways.

3. The method of claim 1, further comprising:
   performing media processing operations on a media item over the first media pathway;
   terminating the media processing operations over the first media pathway; and
   resuming the media processing operations over the second media pathway.

4. The method of claim 3, the step of resuming the media processing operations performed on a second version of the media item.

5. The method of claim 4, wherein the second version of the media item comprises a version of the media item having at least one different quality characteristic.

6. The method of claim 5, the first security level relating to a media item provided by an external source and the second security level relating to a version of the media item generated by the media processing device.

7. The method of claim 1, further comprising:
performing media processing operations on a first media item over the first media pathway;
terminating the media processing operations over the first media pathway;
resuming the terminated media processing operations over the third media pathway.

8. The method of claim 1, the step of ascertaining a first desired level of security performed, at least in part, by a service operator or content provider, further comprising:
prior to selecting the first set of the selectable pathway components, providing an indication of available pathway components that includes an identification of corresponding software components and corresponding hardware components to the service operator or content provider.

9. The method of claim 1, the first or second desired level of security corresponding to requirements of a conditional access or digital rights management system utilized by a service operator.

10. The method of claim 1, the first or second desired level of security corresponding to a certification requirement for processing and delivery operations involving a particular media item or class of media items.

11. The method of claim 1, wherein the first or second media pathway further comprises an upstream portion including a content provider and a downstream portion including a content recipient, wherein at least one of the pathway portions provides a first level of security and at least one of the pathway portions provides a second, less secure level of security.

12. The method of claim 1, wherein the first set of hardware components and the second set of hardware components comprise a plurality of hardware acceleration functions.

13. A method for establishing pathways of varying security levels in a media processing device such as a set top box having a plurality of selectable pathway components relating to operational nodes of the pathways, the method comprising:
establishing a first media pathway utilizing a first set of selectable pathway components of the media processing device that include a first set of software components and a first set of hardware components, the first media pathway conforming to a first level of security;
establishing a second media pathway utilizing a second set of selectable pathway components of the media processing device that include a second set of software components and a second set of hardware components, the second media pathway conforming to a second level of security, the first set of software components differing from the second set of software components by at least one software component and the first set of hardware components differing from the second set of hardware components by at least one hardware component;
performing media processing operations over the first media pathway;
terminating the media processing operations over the first media pathway;
dynamically establishing a third media pathway utilizing a third set of selectable pathway components that include a third set of software components and a third set of hardware components, the third media pathway conforming to a level of security derived from the first level of security, the first set of software components differing from the third set of software components by at least one software component and the first set of hardware components differing from the third set of hardware components by at least one hardware component; and
resuming the terminated media processing operations over the third media pathway.

14. The method of claim 13, the plurality of selectable pathway components including at least one hardware acceleration function selected from the group consisting of: video encoding, video decoding, rendering of graphics, digital rights management, encryption, and decryption.

15. The method of claim 13, the first level of security corresponding to requirements of a conditional access or digital rights management system utilized by a service operator.

16. A media processing device, comprising:
processing circuitry;
an operating system executed by the processing circuitry, the operating system comprising at least one privileged operating system environment and at least one restricted operating system environment; and
a plurality of selectable pathway components comprising components controlled or executed by the at least one privileged operating system environment and components controlled or executed by the at least one restricted operating system environment; and
a security and key management support circuitry to:
establish a first media pathway utilizing a first set of selectable pathway components that include a first set of software components and a first set of hardware components, the first media pathway conforming to a first level of security; and
establish a second media pathway utilizing a second set of selectable pathway components that include a second set of software components and a second set of hardware components, the second media pathway conforming to a second level of security, the first set of software components differing from the second set of software components by at least one software component and the first set of hardware components differing from the second set of hardware components by at least one hardware component; and
dynamically establish a third media pathway utilizing a third set of selectable pathway components that include a third set of software components and a third set of hardware components, the third media pathway conforming to the first desired level of security, the first set of software components differing from the third set of software components by at least one software component and the first set of hardware components differing from the third set of hardware components by at least one hardware component.

17. The media processing device of claim 16, wherein the components controlled or executed by the at least one privileged operating system comprise a plurality of hardware acceleration functions.

18. The media processing device of claim 16, wherein the components controlled or executed by the at least one restricted operating system environment comprise an untrusted software framework.

19. The media processing device of claim 16, the security and key management support circuitry further configured to exchange pathway configuration information with a service operator or content provider including indications of corresponding software components and corresponding hardware components.

20. The media processing device of claim 16, the first media pathway compliant with a certification or conditional access system utilized by a service operator affiliated with the media processing device.

\* \* \* \* \*